US011511756B2

(12) United States Patent
Brown et al.

(10) Patent No.: US 11,511,756 B2
(45) Date of Patent: Nov. 29, 2022

(54) PASSENGER AUTHENTICATION SYSTEM FOR A VEHICLE

(71) Applicant: Ford Global Technologies, LLC, Dearborn, MI (US)

(72) Inventors: Kristopher Karl Brown, Dearborn, MI (US); Steven Wayne Friedlander, Canton, MI (US); Ali Hassani, Ann Arbor, MI (US); Kirk Leonard, Orchard Lake, MI (US); Stuart C. Salter, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 313 days.

(21) Appl. No.: 16/741,032

(22) Filed: Jan. 13, 2020

(65) Prior Publication Data

US 2021/0213957 A1    Jul. 15, 2021

(51) Int. Cl.
*B60W 40/08*    (2012.01)
*G01C 21/34*    (2006.01)
*G07C 9/00*    (2020.01)

(52) U.S. Cl.
CPC ......... *B60W 40/08* (2013.01); *G01C 21/3438* (2013.01); *G07C 9/00309* (2013.01); *B60W 2040/0881* (2013.01); *G07C 2009/00388* (2013.01)

(58) Field of Classification Search
CPC .......... B60W 40/08; B60W 2040/0881; G01C 21/3438; G07C 9/00309; G07C 2009/00388
See application file for complete search history.

(56) References Cited

U.S. PATENT DOCUMENTS

2014/0309806 A1\* 10/2014 Ricci ...................... G06Q 10/20 701/1
2017/0153714 A1\* 6/2017 Gao ........................ G06V 40/20
2017/0294130 A1  10/2017 Donnelly
(Continued)

FOREIGN PATENT DOCUMENTS

CN    206559400 U    10/2017
WO    2019067226 A1    4/2019

*Primary Examiner* — Hunter B Lonsberry
*Assistant Examiner* — Jay Khandpur
(74) *Attorney, Agent, or Firm* — Vichit Chea; Price Heneveld LLP

(57) ABSTRACT

A vehicle system is disclosed herein. A display panel is disposed on the exterior of the vehicle and is configured as a user interface for receiving inputs from a user. An occupant detection device is configured to detect the position of an occupant of the vehicle. A controller is configured to receive a request for pickup from a potential passenger via a first communication; register authorization information based on the first communication; receive a request for vehicle access via a second communication that includes authorization information; and control one or more doors of the vehicle to allow the potential passenger access to the vehicle via the one or more doors in response to the authorization information registered based on the first communication corresponding to the authorization information from the second communication, wherein the controller allows access via the one or more doors based on the position of the occupant detected by the occupant detection device.

20 Claims, 6 Drawing Sheets

(56) References Cited

U.S. PATENT DOCUMENTS

| | | |
|---|---|---|
| 2020/0070715 A1* | 3/2020 | Krause .................... B60Q 3/80 |
| 2020/0086764 A1* | 3/2020 | Mimura ................ B60W 30/18 |
| 2021/0270075 A1* | 9/2021 | Sakiyama ................ H02K 7/06 |
| 2021/0304532 A1* | 9/2021 | Fetter .................... G06V 20/56 |

* cited by examiner

PASSENGER AUTHENTICATION SYSTEM FOR A VEHICLE

FIELD OF THE DISCLOSURE

The present disclosure generally relates to a system for authorizing potential passengers of a vehicle and allowing access to the vehicle. More specifically, the present disclosure generally relates to a system for authorizing a potential passenger of the vehicle, determining a seating availability within the vehicle, and opening one or more doors of the vehicle based on the potential passenger being authorized and the determined seating availability within the vehicle.

BACKGROUND OF THE DISCLOSURE

For-hire vehicles often pick up potential passengers based on communication received from the potential passengers. As vehicle automation becomes common place, new challenges may surface in relation to ride share or for-hire vehicles. The application relates to solutions that may assist with access and operation of such vehicles.

SUMMARY OF THE DISCLOSURE

According to a first aspect of the present disclosure, a system for a vehicle includes an occupant detection device that is configured to detect the position of an occupant of the vehicle. A controller is configured to receive a request for pickup from a potential passenger via a first communication. The controller is further configured to register authorization information based on the first communication. The controller is further configured to receive a request for vehicle access via a second communication that includes authorization information. The controller is further configured to control one or more of a plurality of doors of the vehicle to allow the potential passenger access to the vehicle via the one or more doors in response to the authorization information registered based on the first communication corresponding with the authorization information from the second communication, wherein the controller allows access via the one or more doors based on the position of the occupant detected by the occupant detection device.

Embodiments of the first aspect of the present disclosure may include any one or combination of the following features:
- a display panel disposed on an exterior of the vehicle and configured as a user interface for receiving inputs from a user, wherein the second communication received by the controller is from the display panel;
- the authorization information of the second communication comprises a unique identification code input by the user into the display panel;
- the display panel is disposed on one or more of the plurality of doors of the vehicle;
- the controller allows access to the vehicle via the one or more doors based on the doors corresponding with a seat that is not detected by the occupant detection device as being occupied by the occupant;
- the controller controls the one or more doors of the vehicle to allow the potential passenger access to the vehicle by prompting the one or more doors to be unlocked; and
- a door actuator configured to control the position of the one or more doors, wherein the controller controls the one or more doors of the vehicle to allow the potential passenger access to the vehicle by prompting the actuator to open the one or more doors.

According to a second aspect of the present disclosure, a method of allowing a potential passenger access to a vehicle includes the steps of receiving a request for pickup from the potential passenger via a first communication from a mobile device; registering authorization information based on the first communication; receiving a request for vehicle access via a second communication that includes authorization information; determining an availability of one or more of a plurality of seats within the vehicle; and providing access to the vehicle via one or more of a plurality of doors in response to the authorization information registered based on the first communication corresponding to the authorization information from the second communication, wherein which of the plurality of doors access to the vehicle is provided by is based on the determined availability of the one or more of the plurality of seats within the vehicle.

Embodiments of the second aspect of the present disclosure may include any one or combination of the following features and/or steps:
- seating availability is determined based on the position of one or more occupants within the vehicle detected by an occupant detection device of the vehicle;
- the occupant detection device of the vehicle includes one or more seat sensors corresponding to the one or more seats of the vehicle and configured to detect when the one or more occupants are seated in the one or more seats;
- seating availability is determined based on an expected occupancy of one or more seats within the vehicle;
- the expected occupancy of the one or more seats within the vehicle is based on a received communication from a second potential passenger;
- the authorization information of the second communication comprises a unique identification code input into a display panel disposed on an exterior of the vehicle and configured as a user interface for receiving inputs from a user;
- the display panel is configured to indicate seating availability within the vehicle;
- the step of providing access to the vehicle via the one or more of the plurality of doors further comprises unlocking the one or more doors;
- one or more of the plurality of doors that access to the vehicle is not provided by remains locked when the one or more of the plurality of doors that access the vehicle is provided by unlock; and
- the step of providing access to the vehicle via the one or more of the plurality of doors further comprises opening one or more doors via a door actuator of the vehicle.

According to a third aspect of the present disclosure, a system for a vehicle includes a plurality of doors coupled to the vehicle. A plurality of seats are disposed within the vehicle. A controller is configured to receive a request for pickup from a potential passenger via a first communication from a mobile device, wherein the first communication includes authorization information. The controller is further configured to receive a request for vehicle access via a second communication that includes authorization information. The controller is still further configured to determine an availability of one or more of the plurality of seats disposed within the vehicle. The controller is further configured to control one or more of the plurality of doors of the vehicle to allow the potential passenger access to the vehicle via the one or more doors in response to the authorization information registered based on the first communication corresponding to the authorization information from the second communication, wherein which of the plurality of doors the controller controls to allow access to the vehicle is based on the availability of the one or more of the plurality of seats disposed within the vehicle.

Embodiments of the third aspect of the present disclosure may include any one or combination of the following features:
- an occupant detection device configured to detect which of the plurality of seats an occupant of the vehicle is seated within, wherein the controller is configured to determine the availability of one or more of the plurality of seats disposed within the vehicle based on the detection of the seated occupant by the occupant detection device; and
- the controller is configured to determine the availability of one or more of the plurality of seats disposed within the vehicle based on a communication received by the controller from a second potential passenger.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

For purposes of description herein, the terms "upper," "lower," "right," "left," "rear," "front," "vertical," "horizontal," "interior," "exterior," and derivatives thereof shall relate to vehicular directions. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction, or the like, does not mean that the feature or component follows a straight line or axis in such a direction or that it only extends in such direction or on such a plane without other directional components or deviations, unless otherwise specified.

Figure 1:
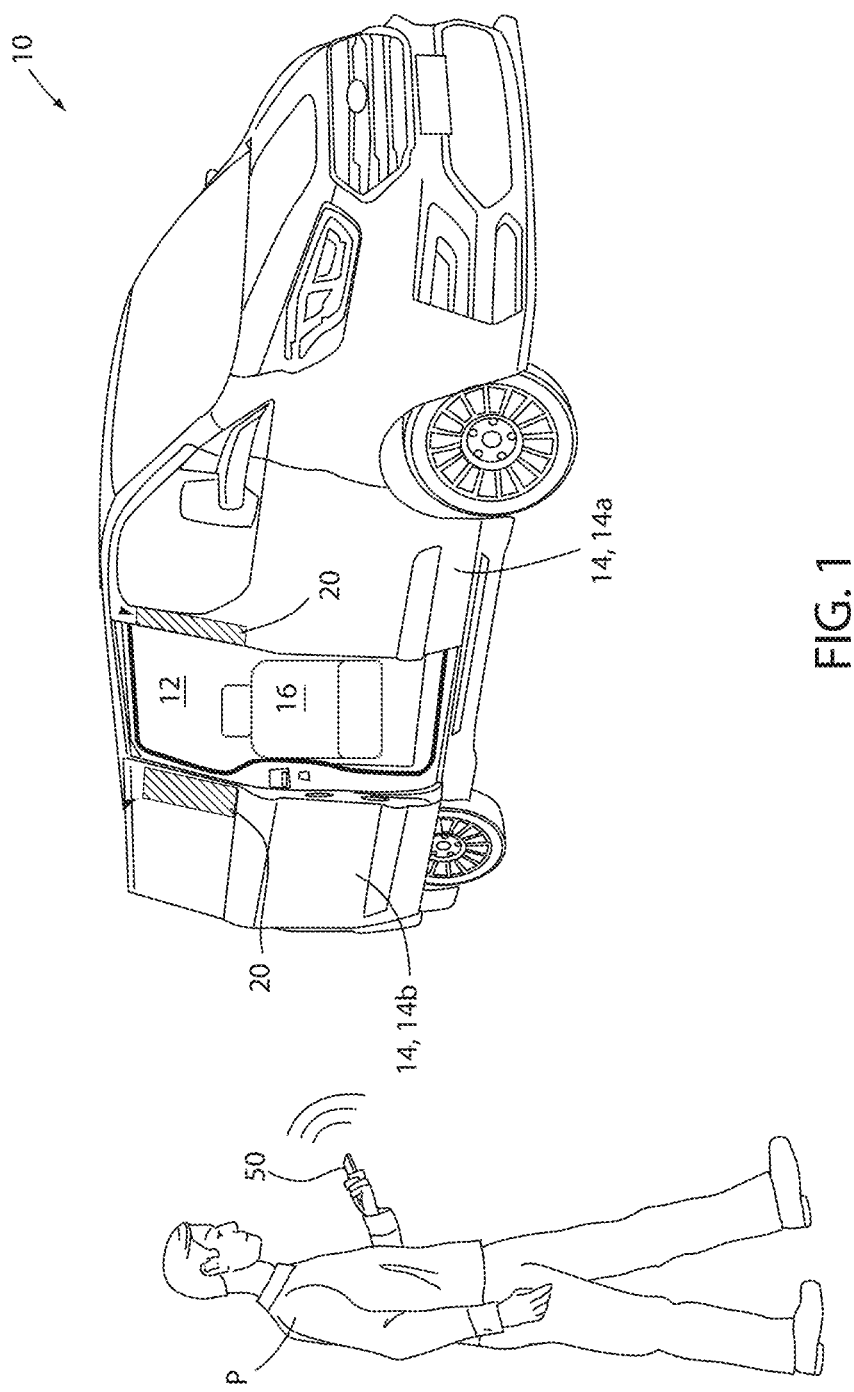
FIG. 1 is a perspective view of a vehicle, illustrating display panels on an exterior of the vehicle and a potential passenger outside of the vehicle, according to one embodiment.
Figure 2A:
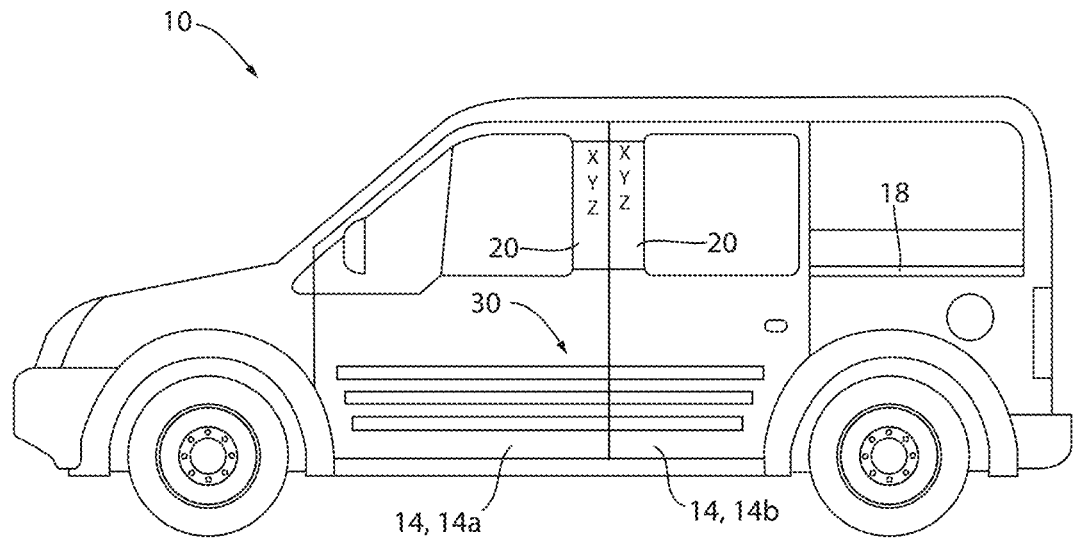
FIG. 2A is a side view of the vehicle, illustrating a door of the vehicle in a closed position, according to one embodiment.
Figure 2B:
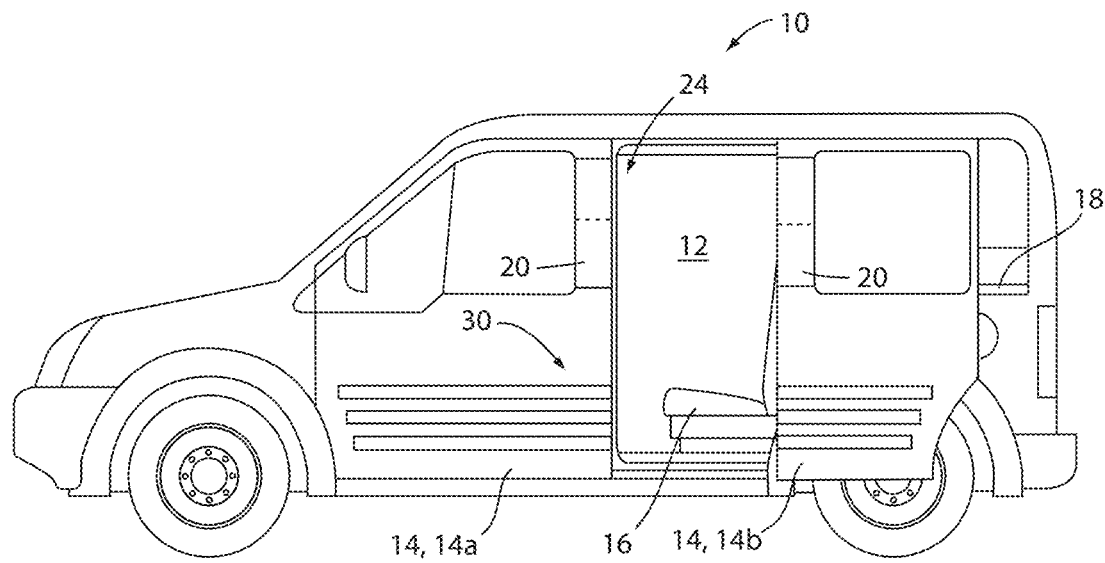
FIG. 2B is a side view of the vehicle, illustrating the door of the vehicle in an open position, according to one embodiment.

Referring to FIGS. 1-2B, a vehicle 10 is shown. In various embodiments, the vehicle 10 is contemplated to be a for-hire vehicle or taxi for which a transport fare is generated for transporting passengers. Further, in some embodiments, the vehicle 10 is contemplated to be an autonomous vehicle or operator-less vehicle that is configured to transport passengers in a fully automated manner without the presence of an on-board driver or operator. As will be described herein, the present disclosure involves systems, methods, and devices used for authorizing or verifying that a potential passenger P of the vehicle 10 is authorized to enter the vehicle 10 and controlling various vehicle components based on the positions of actual and expected occupants of vehicle 10.

In further reference to FIGS. 1-2B, the vehicle 10 may include a plurality of doors 14. The doors 14 may be operable between a closed position, as exemplified in FIG. 2A, and an open position, as exemplified in FIG. 2B. In some embodiments, a first door 14a may be a conventional hinge-mounted door and a second door 14b may be a sliding door configured to glide along a track 18. It is contemplated, however, that the doors 14 may be implemented in a variety of configurations without departing from the spirit of the disclosure.

As illustrated in FIGS. 1 and 2B, the vehicle 10 may include a plurality of seats 16 disposed within a passenger compartment 12 of the vehicle 10. In various embodiments, the plurality of seats 16 may be at least one of a variety of seat types. For example, in some embodiments, one or more of the plurality of seats 16 may be configured as bucket seats, while other seats 16 may be configured as bench-style seating.

In various embodiments, the vehicle 10 may include one or more display panels 20. As shown in FIGS. 1-2B, in some embodiments, the one or more display panels 20 may be disposed on one or more of the plurality of doors 14 of the vehicle 10. In some examples, the one or more display panels 20 may be disposed on an exterior 30 of the vehicle 10. It is contemplated that, in some embodiments, each side door 14 of the vehicle 10 may include one or more display panels 20. Further, it is contemplated that, in some embodiments, only certain doors 14 of the vehicle 10 may include one or more display panels 20.

Figure 3:
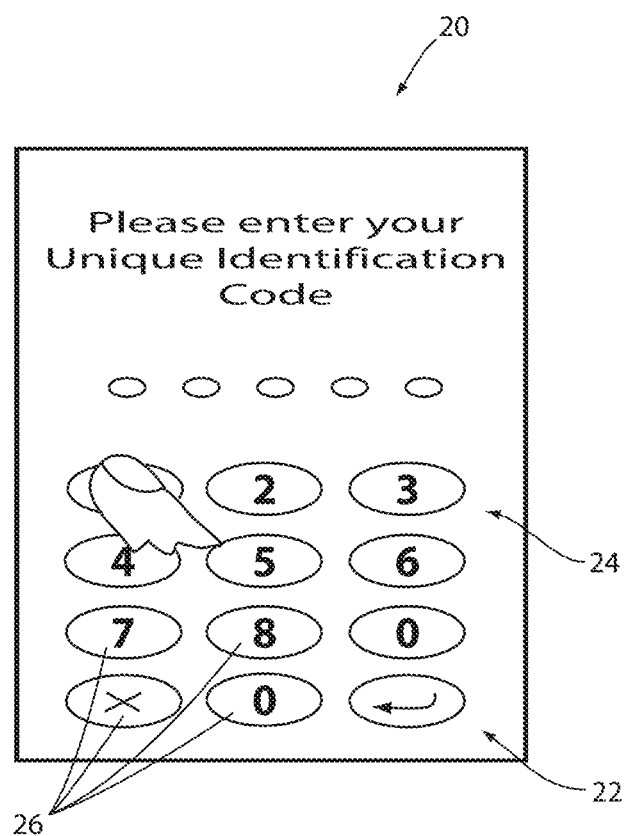
FIG. 3 is a front view of the display panel of the vehicle, illustrating a plurality of virtual inputs configured as a keypad disposed on a display surface of the display panel, according to one embodiment.

Referring now to FIG. 3, in some embodiments, the one or more display panels 20 may be configured to operate as one or more user interfaces 22. For example, the one or more display panels 20 may comprise one or more touch or proximity sensors configured to identify a location of an object in proximity to a display surface 24 of the one or more display panels 20. In such configurations, a controller 32 of the one or more display panels 20 may generate and/or present a plurality of virtual inputs 26 which may be programmed to control operations of one or more of the plurality of doors 14 and/or various systems of the vehicle 10 in response to the detection of a proximate object.

In operation, the one or more display panels 20 may display the virtual inputs 26 based on one or more operating conditions of the vehicle 10 and/or based on information received by the controller 32 from another device, such as a mobile device 50. For example, the controller 32 of the one or more display panels 20 may display the virtual inputs 26 in the form of a keypad, as depicted in FIG. 3, in response to receiving one or more communications from the mobile device 50 (e.g., a first communication from the mobile device 50 indicating a request for pickup from the potential passenger P).

Figure 5:
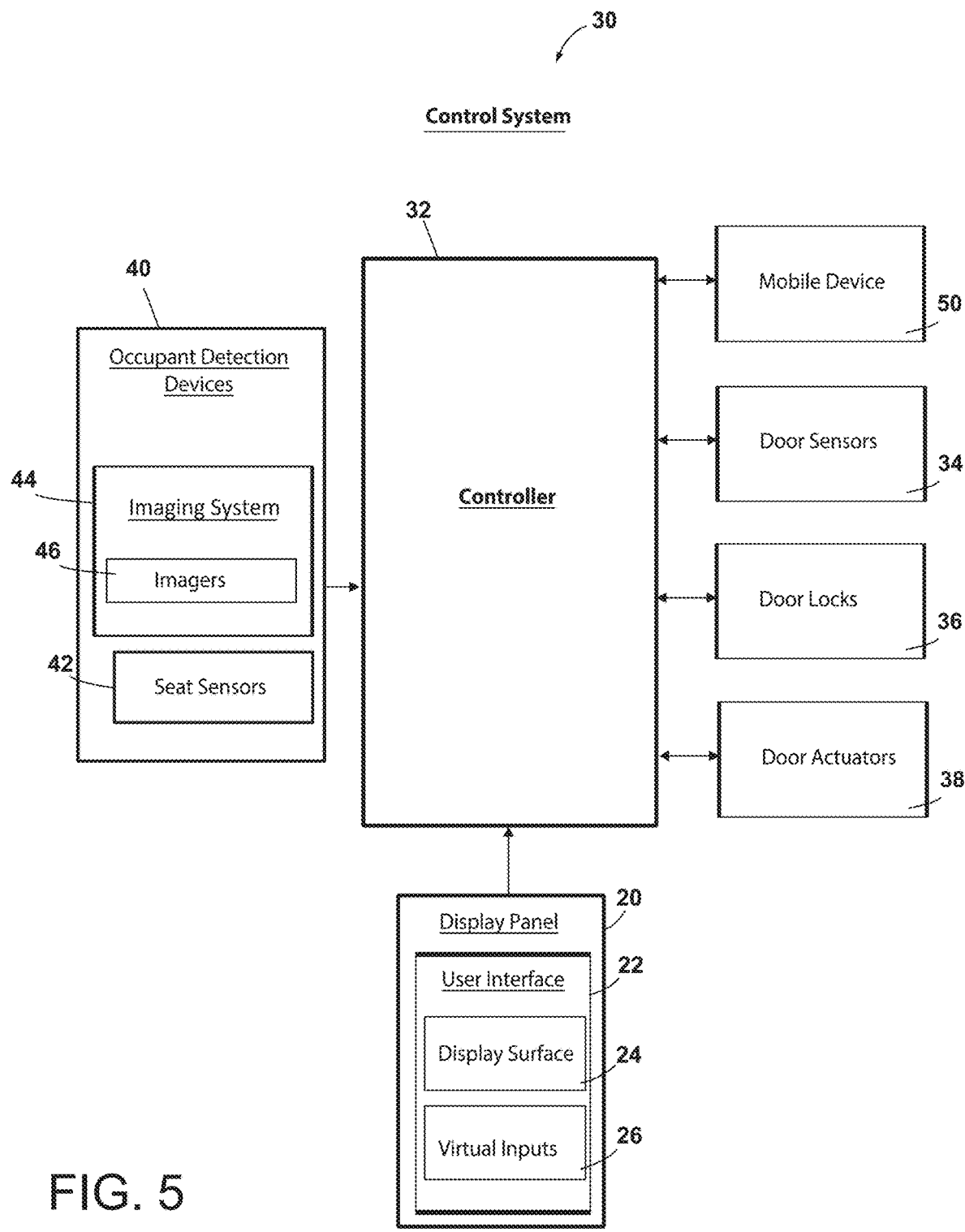
FIG. 5 is a block diagram of a control system, illustrating a controller in communication with various other vehicle and non-vehicle components and devices, according to one embodiment.

Referring now to FIG. 5, a block diagram of a control system 30 comprising various vehicle 10 and non-vehicle components and devices is shown. The control system 30 may comprise the controller 32, which may comprise one or more processors and/or memory devices. Such devices may include, but are not limited to, one or more circuits, processors, microprocessors, and various volatile or non-volatile memory devices. The controller 32 of the control system 30 may provide for the various operations discussed herein.

In various embodiments, the controller 32 may be in communication with the one or more display panels 20. The controller 32 may further be in communication with one or more touch sensors disposed in each of the display panels 20, which may be configured as part of the user interface 22 to receive touch inputs from a user.

In various embodiments, the controller 32 may also be in communication with one or more door sensors 34, door actuators 36, and/or door locks 38. In this configuration, the controller 32 may be operable to detect one or more of the plurality the doors 14 in the open and closed positions and control the position or motion of the doors 14 via the door actuators 36. The door actuators 36 may correspond to one or more rotational or translational actuators or motors, which may be configured to control the motion or position of one or more of the plurality of doors 14 as discussed herein. Further, the controller 32 may be operable to control the door locks 38. For example, the controller 32 may be operable to lock or unlock one or more of the door locks 38 selectively based on receiving data from various sources, such as receiving inputs entered into the one or more display panels 20 configured as user interfaces 22, or receiving a communication from the mobile device 50.

Figure 4:
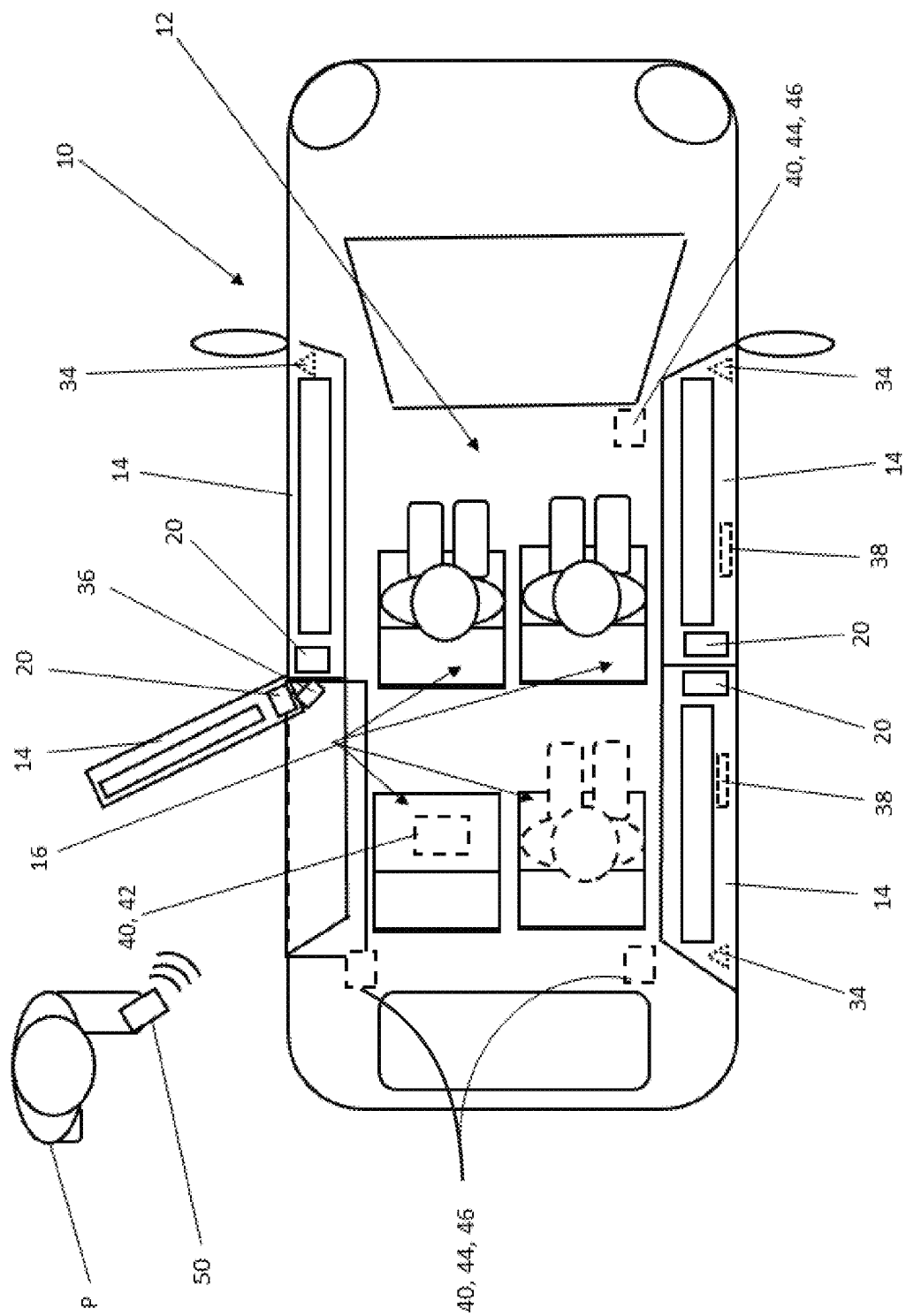
FIG. 4 is top-down view of the vehicle, illustrating occupants seated in front seats of the vehicle, an expected occupant represented in phantom in a right, rear seat of the vehicle, the potential passenger outside of the vehicle and an open rear, left door that corresponds with a vacant left, rear seat of the vehicle, according to one embodiment.

Referring now to FIGS. 4 and 5, in various embodiments, the controller 32 may be in communication with and/or may monitor a plurality of occupant detection devices 40 of the vehicle 10. In some implementations the occupant detection devices 40 may comprise a plurality of seat sensors 42, which may include pressure or weight sensors disposed in one or more of a plurality of vehicle seats 16. In some embodiments, the controller 32 may also or alternatively monitor one or more seatbelt sensors to monitor the occupancy of one or more of the plurality of seats 16 and/or anticipate changes in the occupancy of the passenger compartment 12.

In some embodiments, the occupant detection devices 40 may further or alternatively comprise an imaging system 44 comprising one or more imagers 46. The one or more imagers 46 may be configured to capture image data of a variety of portions of the passenger compartment 12 and regions proximate to the vehicle 10. In operation, the controller 32 may be configured to process the image data from each of the imagers 46. In this way, the controller 32 may be configured to identify a location of occupants within the vehicle 10 and/or identify a location of one or more potential passengers P relative to the vehicle 10. Based on the location of the one or more occupants the controller 32 may identify the seats 16 in which the one or more occupants are seated. Similarly, the controller 32 may process the image data to identify one or more of the plurality of doors 14 that correspond or open to a vacant seat 16 in the vehicle 10. Alternatively, or in addition to the image data, the controller 32 may process data from each of the seat sensors 42 disposed in one or more of the plurality of seats 16 to identify a vacancy and determine the seated position of the occupants of the vehicle 10.

In general, the occupant detection device or devices 40 may comprise any form of data acquisition device or any combination of sensory devices that may be in communication with the controller 32. The occupant detection device 40 may correspond to a device configured to capture image data, for example, an imager, a video camera, an infrared imager, a scanner, or any device configured to capture text, graphics, images, and/or video data. In some embodiments, the occupant detection device 40 may correspond to a device configured to capture voice or any form of audio data, for example, a microphone, an audio decoder, and/or an audio receiver, such that a voice signature or other audio signature may be detected. The occupant detection device 40 may also correspond to a capacitive, an image-based, and/or a pressure-based sensor, which may be configured to scan a finger print, palm, face, and/or various other biometric features. It is contemplated that, in some embodiments, an image sensor may be configured to identify a facial feature, height, profile shape, gaze direction, head position, and/or any other form of visual data. In this way, the controller 32 may be configured to utilize information captured by the occupant detection devices 40 to identify the location and/or behavior of the occupants of the vehicle 10 and/or the potential passenger P approaching the vehicle 10.

In various embodiments, the controller 32 may be operable to communicate with the mobile device 50 (e.g., a smart phone, a smart watch, a fob, a tablet, etc.). In various embodiments, the controller 32 may be operable to communicate with a plurality of different mobile devices 50. For example, the controller 32 may be operable to communicate with the mobile device 50 of a first potential passenger P of the vehicle 10, and the mobile device 50 of a second potential passenger P of the vehicle 10, such that the controller 32 may receive communications from the mobile device 50 of both potential passengers P. It is contemplated that the controller 32 may communicate with the mobile device 50 via one or more of a plurality of long and/or short range communication protocols. For example, in some embodiments, exemplary communication protocols may correspond to a mobile data or cellular communication including, but not limited to, a cellular or broadband wireless communication and similar communication methods (e.g., GSM, CDMA, WCDMA, GPRS, WiFi, WiMax, 3G, 4G, etc.). In some embodiments, the communication protocols may also correspond to a radio communication interface including, but not limited to, RFID, Bluetooth®, Bluetooth® Low Energy (BLE), ANT+, NFC, ZigBee®, infrared, ultraband, etc.

It is contemplated that, in various embodiments, the controller 32 may be operable to communicate with the mobile device 50 via intermediate communication devices and/or systems. For example, it is contemplated that, in some embodiments, the controller 32 may be in communication with a communication circuit of the vehicle 10 that may correspond with a wireless receiver and/or transmitter that is configured to communicate with the mobile device 50. Further, it is contemplated that a variety of types of data and information may be communicated between the controller 32 and the mobile device 50. For example, in some embodiments, positional data may be communicated between the controller 32 and the mobile device 50, such that the controller 32 may be able to receive and/or determine the location of the mobile device 50, generally and/or in relation to the vehicle 10. As such, in some embodiments, the controller 32 may be configured to receive information about and/or determine whether the mobile device 50 is inside or outside of the vehicle 10. Further, in some embodiments, the controller 32 may be configured to receive information about and/or determine the position of the mobile device 50 within the vehicle 10, generally and/or relative to other vehicle components. For example, in some embodiments, the controller 32 may determine that the mobile device 50 is proximate to one or more of the plurality of seats 16 of the vehicle 10.

Further, in some embodiments, the controller 32 may process data from the mobile device 50, as described above, to infer the location of one or more potential passengers P outside of the vehicle 10 and/or the location of one or more occupants of the vehicle 10. For example, in some embodiments, the controller 32 may infer that the mobile device 50 (e.g., a smart phone) is proximate to the potential passenger P or occupant, such that the location of the potential passenger P and/or occupant may be inferred from the location of the mobile device 50 received and/or determined by the controller 32. In such embodiments, the mobile device 50 may act as one of the occupant detection devices 40. As such, in some embodiments, the controller 32 may also potentially identify the seat 16 in which the occupant is seated by determining the location of the occupant's mobile device 50.

In various embodiments, the controller 32 may be configured to receive and process information communicated to the controller 32 from the mobile device 50 pertaining to the vehicle 10 operating as a for-hire vehicle. For example, in various embodiments, the controller 32 may receive a request for pickup from one or more potential passengers P via one or more communications from one or more mobile devices 50. Further, in some embodiments, the controller 32 may receive a request for vehicle access from one or more potential passengers P via one or more communications from the one or more mobile devices 50 and/or the display panel 20 configured as the user interface 22.

In some embodiments, the controller 32 may be configured to register that one or more of the plurality of seats 16 of the vehicle 10 are reserved (e.g., purchased, etc.) for one or more potential passengers P based on the one or more communications received by the controller 32 from one or more mobile devices 50. As such, the controller 32 may be configured to determine a seating availability within the vehicle 10 based on expected occupancy of one or more seats 16 in the vehicle 10 (i.e., based on which seats have been reserved and/or purchased) in addition to sensed current occupancy of the seats 16 in the vehicle 10 as detected by the occupant detection devices 40 of the vehicle 10. In some embodiments, the controller 32 may be configured to control one or more of the display panels 20, such that the one or more display panels 20 indicate the seating availability within the vehicle 10. For example, display panels 20 disposed on doors 14 of the vehicle 10 that correspond with seats 16 that are occupied or reserved may display red back-lighting, while doors 14 that correspond with available seats 16 may display green back-lighting. It is contemplated that seating availability may be indicated on the one or more display panels 20 in various manners. As described in more detail below, the controller 32 may be configured to control various operations of the vehicle 10 and/or components of the vehicle 10 based on the determined seating availability within the passenger compartment 12.

In various embodiments, the controller 32 may be configured to authorize or verify that the potential passenger P is authorized to enter the vehicle 10. In some embodiments, the controller 32 may be operable to confirm or authorize an identity of the potential passenger P prior to making the vehicle 10 accessible. In various embodiments, this may be accomplished via communication between the controller 32 and various other devices, such as one or more mobile devices 50 and/or one or more display panels 20 of the vehicle 10 configured as user interfaces 22. Further, in various embodiments, the authorization of the potential passenger P may be accomplished by the controller 32 via utilization of one or more forms of authorization information received by the controller from one or more communications and/or registered by the controller based on one or more received communications. For example, in some embodiments, the controller 32 may receive a first communication and register authorization information based on the first communication, the subsequently receive a second communication that includes authorization information. The controller 32 may then be configured to verify that the potential passenger P is authorized to enter the vehicle 10 based on the authorization information initially registered corresponding with the authorization information of the second communication.

It is contemplated that, in various embodiments, authorization information may be registered by the controller 32 based on the first communication in a variety of ways. In some embodiments, the controller 32 may register authorization information based on the first communication by receiving the authorization information via the first communication. For example, in some embodiments, the controller 32 may receive the first communication from the mobile device 50 that includes authorization information in the form of a unique identification code, and register the unique identification code as the pertinent authorization information for the potential passenger P.

Further, in some embodiments, the controller 32 may register authorization information based on the first communication by determining and/or retrieving the authorization information based on characteristics and/or the source of the first communication. For example, in some embodiments, the controller 32 may receive the first communication from the mobile device 50 of a potential passenger P and retrieve stored authorization information associated with the mobile device 50 based on the IP address assigned to the mobile device 50. Further, in some embodiments, the controller 32 may receive the information in the first communication from the mobile device 50 indicating the identity of the potential passenger P and may retrieve stored authorization information associated with the indicated identity of the potential passenger P.

In an exemplary embodiment, the controller 32 of the vehicle 10 may be configured to verify that the potential passenger P is authorized to enter the vehicle 10 as follows: The controller 32 receives a first communication from the mobile device 50 in the form of a request for pickup and transportation of a potential passenger P from a first location. A unique identification code associated with the mobile device 50 and/or the potential passenger P is transmitted to the controller 32 in the first communication, and the controller 32 registers the unique identification code received as the authorization information. The controller 32 receives a second communication from the display panel 20 of the vehicle 10, which is configured as the user interface 22, in the form a unique identification code input into the display panel 20 by the potential passenger P. The controller 32 then verifies that the potential passenger P is authorized to enter the vehicle 10 when the unique identification code received from the first communication corresponds with the unique identification code received from the second communication.

It is contemplated that the controller 32 of the vehicle 10 may be configured to authorize the potential passenger P in at least one of a variety of ways not specifically mentioned above. For example, while corresponding unique identification codes are described above as authorization information, it should be appreciated that authorization information may include various types and/or forms of information (e.g., unique identifiable communication signal of the mobile device 50, finger print of the potential passenger P, facial features of the potential passenger P, etc.). Further, it is contemplated that in some embodiments, the first and second communications may both be received by the controller 32 from the mobile device 50 and/or various other devices.

Referring now to FIGS. 4 and 5, in various embodiments, the controller 32 may be configured to provide access to the vehicle 10 via one or more of the plurality of doors 14 of the vehicle 10 based on an authorization of the potential passenger P and the determined seating availability within the vehicle 10. In other words, the controller 32 may unlock and/or open one or more particular doors 14 of the vehicle 10 based on authorization of the potential passenger P and the determined seating availability within the vehicle 10. For example, as shown in FIG. 4, in some embodiments, in which the controller 32 determines that only a rear seat 16 proximate to the rear, left door 14 of the vehicle 10 is available, as the front seats 16 are physically occupied, and the rear, right seat 16 is reserved (denoted by an occupant illustrated in phantom). As such, the controller 32 may prompt the door actuator 36 to open the rear, left door 14 of the vehicle 10 to allow the potential passenger P access to the vacant rear, left seat 16 when the controller 32 authorizes that the potential passenger P is authorized to enter the vehicle 10. Meanwhile, the other doors 14 may remain closed and/or locked.

Referring still to FIGS. 4 and 5, in operation of an exemplary embodiment of the vehicle 10 as a for-hire vehicle, the controller 32 of the vehicle 10 may initially receive a request for pickup at a pickup location from a potential passenger P via a first communication from the mobile device 50, wherein the first communication includes a unique identification code associated with the potential passenger P and/or the mobile device 50.

The controller 32 may then register authorization information based on the first communication. In other words, the controller 32 may register that the unique identification code received in the first communication is the authorization information.

The controller 32 then determines a seating availability of the vehicle 10 based on sensed current occupancy data received from the one or more occupant detection devices 40 of the vehicle 10 and expected occupancy data (i.e., whether seats 16 of the vehicle 10 have been reserved) received from other devices (e.g., a second mobile device 50 of a second potential passenger P).

Having determined a seating availability of the vehicle 10, the controller 32 determines which of the one or more doors 14 of the vehicle 10 correspond to the determined seating availability. In other words, the controller 32 determines which of the doors 14 of the vehicle would generally allow the most immediate and/or convenient access to the available seats 16 within the vehicle 10. For example, when the rear, left seat 16 of the vehicle 10 is available, as shown in FIG. 4, the controller 32 may determine that the rear, left door 14 of the vehicle 10 corresponds to the seating availability of the vehicle 10.

When the vehicle 10 arrives at the pickup location, the potential passenger P approaches the vehicle 10 and requests access to the vehicle 10 via a second communication to the controller 32 that includes authorization information in the form of a unique identification code. The second communication is transmitted to the controller 32 via the display panel 20. The potential passenger P inputs the unique identification code into the display panel 20 disposed on the exterior portion of the door 14 of the vehicle 10 by touching virtual inputs 26 on the display panel 20 that correspond to touch sensors disposed within the display panel 20.

If the controller 32 determines that the unique identification code inputted by the potential passenger P in the second communication does not correspond with the unique identification code received from the mobile device 50 in the first communication and registered by the controller 32, then the controller 32 will refuse to allow the potential passenger P to access to the vehicle 10 (i.e., the controller 32 will not unlock and/or open the doors 14 of the vehicle 10). In this case, the potential passenger P may be able to re-enter the unique identification code to attempt to gain access to the vehicle 10. It is contemplated that after a certain number of unsuccessful unique identification code entries, the display panel 20 may "lock out" the potential passenger P for a given duration, such that the potential passenger P no longer has the option to re-enter the unique identification code, for security purposes.

If the controller 32 determines that the unique identification code inputted by the potential passenger P does correspond with the unique identification code registered by the controller 32, then the controller 32 may control one or more of the plurality of doors 14 of the vehicle 10 to allow the potential passenger P access to the vehicle 10 based on the seating availability determined by the controller 32, while denying access to the vehicle 10 through the one or more other doors 14 of the vehicle 10. For example, the controller 32 may control the door locks 38 and/or the door actuators 36 to unlock and/or open the rear, left door 14 of the vehicle 10 based on determinations previously made by the controller 32 that the rear, left seat 16 is vacant, while the controller 32 may maintain the rear, right door 14 in the locked, closed position, based on a determination that the rear, right seat 16 of the vehicle 10 is occupied by an occupant. Allowing access to the vehicle 10 via specific doors 14 based on seating availability may aid potential passengers P and/or occupants in conveniently entering and/or exiting the vehicle 10.

It is contemplated that, in various embodiments, the controller 32 may be operable to receive and process requests and communications from potential passengers P pertaining to various other aspects of the operation of the vehicle 10 as a for-hire vehicle. For example, in some embodiments, the controller may be configured to process communications from potential passengers P that request a seat 16 location preference. For example, in some embodiments, the controller 32 may be operable to accommodate a request from the potential passenger P to be seated within a rear seat 16 of the vehicle 10, as opposed to a front seat 16 of the vehicle and vice versa. In some embodiments, the controller 32 may be configured with logic that classifies different seats 16 into different classes. For example, in some embodiments, front seats may be a first class and rear seats 16 may be a second class. In some such embodiments, the controller may be operable to receive requests for seating in one or more particular classes of seats 16 within the vehicle 10 from the potential passenger P. In various embodiments, the controller 32 may be further configured with logic to take these for-hire vehicle operation aspects into account in determining which of the plurality of doors 14 access to the vehicle 10 should be provided to the potential passenger P by. For instance, in a non-limiting exemplary embodiment, in which the potential passenger P requests to be seated in a front seat 16 of the vehicle 10, the controller 32 may accommodate that request by opening one or more doors 14 of the vehicle 10 that correspond with vacant front seats 16 of the vehicle 10.

Figure 6:
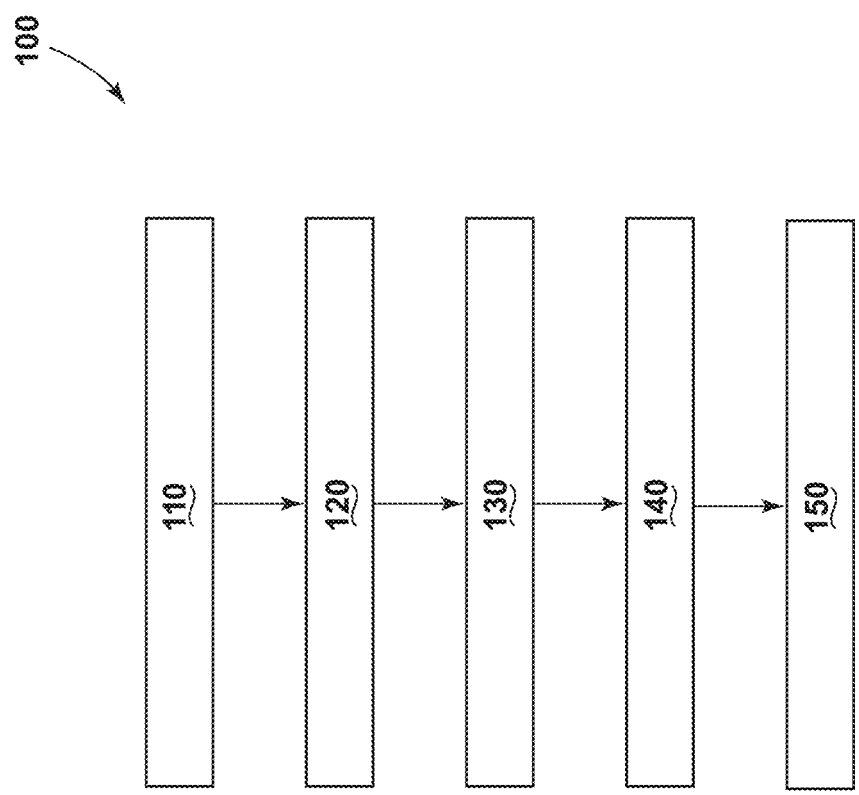
FIG. 6 is a flow chart illustrating the steps of a method of allowing the potential passenger access to the vehicle, according to one embodiment.

Referring now to FIG. 6, a method 100 of allowing the potential passenger P access to the vehicle 10 is shown. In various embodiments, the method 100 may include the step 110 of receiving a request for pickup from the potential passenger P. In various embodiments, the request for pickup from the potential passenger P may be received via a first communication from the mobile device 50. In some embodiments, the first communication may include authorization information. In some embodiments, the authorization information of the first communication may be in the form of the unique identification code, as discussed above. It is contemplated that, in various embodiments, the authorization information of the first communication may include one or more of a variety of types of information.

In various embodiments, the method 100 of allowing the potential passenger P access to the vehicle 10 may further include the step 120 of registering authorization information based on the first communication. As discussed above, authorization information may be registered based on the first communication in a variety of ways, in various embodiments. In some embodiments, authorization information may be registered based on the first communication by receiving the authorization information via the first communication. For example, in some embodiments, the first communication may be received from the mobile device 50 and include authorization information in the form of a unique identification code. As such, the unique identification code may be registered as the pertinent authorization information for the potential passenger P. Further, as discussed above, in some embodiments, authorization information may be registered based on the first communication by determining authorization information and/or retrieving stored authorization information based on characteristics and/or the source of the first communication.

In various embodiments, the method 100 of allowing the potential passenger P access to the vehicle 10 may further include the step 130 of receiving a request for vehicle access. In various embodiments, the request for vehicle access may be received via a second communication. The second communication may be from one or more of a variety of sources. For example, in various embodiments, the second communication may be from the mobile device 50 and/or the display panel 20 configured as the user interface 22. Further, in various embodiments, the second communication may include authorization information. In some embodiments, the authorization information may be in the form of the unique identification code. In some examples, the unique identification code may be inputted into the display panel 20 of the vehicle 10, as discussed above. It is contemplated that, in various embodiments, the authorization information of the second communication may be one or more of a variety of types and/or forms of information, as previously discussed.

The method 100 of allowing the potential passenger P access to the vehicle 10 may further include the step 140 of determining the availability of one or more of the plurality of seats 16 within the vehicle 10. In various embodiments, the availability of the one or more of the plurality of seats 16 within the vehicle 10 (i.e., seating availability) may be determined by the controller 32 of the vehicle 10 based on sensed current occupancy data received from the one or more occupant detection devices 40 of the vehicle 10, and the information pertaining to the expected occupancy of the one or more seats 16 within the vehicle 10, as discussed above. In some embodiments, the seating availability may be determined based on the position of one or more occupants within the vehicle 10 as detected by the one or more occupant detection devices 40 of the vehicle 10.

As discussed above, in some embodiments, the occupant detection devices 40 of the vehicle 10 may include one or more seat sensors 42 corresponding to one or more seats 16 of the vehicle 10. The seat sensors 42 may be configured to detect the one or more occupants of the vehicle 10 seated within the one or more seats 16 of the vehicle 10. In various embodiments, the seating availability, that is, the availability of one or more of the plurality of seats 16 within the vehicle 10, may be determined based on the expected occupancy of one or more of the seats 16 within the vehicle 10, in addition to the sensed current occupancy of the seats 16 of the vehicle 10, as determined by the controller 32 in combination with the one or more occupant detection devices 40 of the vehicle 10. In some embodiments, the expected occupancy of the one or more seats 16 within the vehicle 10 may be based on a received communication from a second potential passenger P. For example, the expected occupancy may be based on a communication received from the mobile device 50 of the second potential passenger P. It is contemplated that in various embodiments, the expected occupancy of the vehicle 10 may be determined by the controller 32 based on a variety of factors. For example, in some embodiments, the controller 32 may receive requests for pickup from multiple potential passengers P (e.g., 3) before any of the potential passengers P have entered the vehicle 10. In such embodiments, the controller 32 may be configured to account for these communications in determining an expected occupancy of the vehicle 10. The controller 32 may further be configured to utilize the expected occupancy data to determine an occupancy status. For example, in some embodiments, the controller 32 may determine that the occupancy status of the vehicle 10 is at full capacity based on the expected occupancy of the vehicle 10 pursuant to receiving multiple requests for pickup. This occupancy status may be represented to other potential passengers P to demonstrate that the vehicle 10 is not available to pick up any more potential passengers P at present, in some embodiments.

In various embodiments, the method 100 of allowing the potential passenger P access to the vehicle 10 may include the step 150 of providing access to the vehicle 10. In various embodiments, access to the vehicle 10 may be provided via one or more of the plurality of doors 14 of the vehicle 10. In some embodiments, access to the vehicle 10 may be provided via the one or more doors 14 when the authorization information registered based on the first communication corresponds to the authorization information from the second communication. For example, in some embodiments, access to the vehicle 10 may be provided when the registered unique identification code of the first communication received matches the unique identification code of the second communication received.

In various embodiments, the step 150 of providing access to the vehicle 10 may include unlocking one or more doors 14 of the vehicle 10. In other words, one or more of the doors 14 of the vehicle 10 may be unlocked in the step 150 of providing access to the vehicle 10 via the one or more doors 14 of the vehicle 10. Further, in some embodiments, one or more of the plurality of doors 14 of the vehicle 10 that do not provide access to the vehicle 10 in step 140 may remain locked when the access-granting doors 14 are unlocked.

In some embodiments, the step 150 of providing access to the vehicle 10 via the one or more of the plurality of doors 14 may include opening the one or more doors 14 via the door actuator 36 of the vehicle 10. In some examples, one or more of the plurality of doors 14 that access to the vehicle 10 is not provided by may remain closed when the one or more access-granting doors 14 are opened by the door actuator 36.

In various embodiments, which of the plurality of doors 14 access to the vehicle 10 is provided by may be based on the determined availability of one or more of the plurality of seats 16 within the vehicle 10. In other words, which door or doors 14 of the vehicle are unlocked or opened by the door actuators 36 may be based on the determined seating availability within the vehicle 10. For instance, in some examples, when it is determined that a right, rear seat 16 of the vehicle 10 is reserved, but a left, rear seat 16 of the vehicle 10 is unoccupied, as shown in FIG. 4, access to the vehicle 10 may be provided through the left, rear door 14 of the vehicle 10 that is proximate to the unoccupied, unreserved seat 16.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A system for a vehicle, comprising:
   an occupant detection device configured to detect a position of an occupant of the vehicle; and
   a controller configured to:
      receive a request for pickup from a potential passenger via a first communication;
      register authorization information based on the first communication;
      control a first display disposed on a first door of the vehicle and configured as a user interface to display a first availability indication based on the position of the occupant of the vehicle;
      control a second display disposed on a second door of the vehicle and configured as a user interface to display a second availability indication based on the position of the occupant within the vehicle;
      receive a request for vehicle access via a second communication input into at least one of the first and second displays that includes authorization information; and
      control at least one of the first and second doors of the vehicle to allow the potential passenger to access the vehicle via the at least one of the first and second doors in response to the authorization information registered based on the first communication corresponding to the authorization information from the second communication, wherein the controller allows access via the at least one of the first and second doors based on the position of the occupant detected by the occupant detection device.

2. The system of claim 1, wherein the controller allows access to the vehicle via the at least one of the first and second doors based on the at least one of the first and second doors corresponding with a seat that is not detected by the occupant detection device as being occupied by the occupant.

3. The system of claim 1, wherein the controller controls the at least one of the first and second doors of the vehicle to allow the potential passenger access to the vehicle by prompting the at least one of the first and second doors to be unlocked.

4. The system of claim 1, further comprising:
   a door actuator configured to control the position of the at least one of the first and second doors, wherein the controller controls the at least one of the first and second doors of the vehicle to allow the potential passenger access to the vehicle by prompting the actuator to open the at least one of the first and second doors.

5. A method of allowing a potential passenger access to a vehicle, comprising:
   receiving a request for pick up from the potential passenger via a first communication from a mobile device;
   registering authorization information based on the first communication;
   determining an availability of one or more of a plurality of seats within the vehicle;
   displaying a negative availability indication from a first display panel that is coupled to a first door of the vehicle and configured as a user interface based on the determined availability of the one or more of the plurality of seats;
   displaying a positive availability indication from a second display panel that is coupled to a second door of the vehicle and configured as a user interface based on the determined availability of the one or more of the plurality of seats;
   receiving a request for vehicle access via a second communication input into the second display panel, wherein the second communication includes authorization information; and
   providing access to the vehicle via the second door in response to the authorization information registered based on the first communication corresponding to the authorization information from the second communication, wherein access to the vehicle is provided by the second door based on the determined availability of the one or more of the plurality of seats within the vehicle.

6. The method of claim 5, wherein seating availability is determined based on the position of one or more occupants within the vehicle detected by an occupant detection device of the vehicle.

7. The method of claim 6, wherein the occupant detection device of the vehicle includes one or more seat sensors corresponding to one or more seats of the vehicle and configured to detect when the one or more occupants are seated in the one or more seats.

8. The method of claim 5, wherein seating availability is determined based on an expected occupancy of one or more seats within the vehicle.

9. The method of claim 8, wherein the expected occupancy of the one or more seats within the vehicle is based on a received communication from a second potential passenger.

10. The method of claim 5, wherein the authorization information of the second communication comprises a unique identification code input into the second display panel disposed on an exterior of the vehicle.

11. The method of claim 5, wherein the step of providing access to the vehicle via the second door further comprises: unlocking the second door.

12. The method of claim 11, wherein the first door that access to the vehicle is not provided by remains locked when the second door that access to the vehicle is provided by is unlocked.

13. The method of claim 5, wherein the step of providing access to the vehicle via the second door further comprises: opening the second door via a door actuator of the vehicle.

14. A system for a vehicle, comprising:
first and second doors coupled to the vehicle;
first and second display panels disposed on the first and second doors, respectively, and configured as user interfaces for receiving inputs from a user;
a plurality of seats disposed within the vehicle; and
a controller configured to:
receive a request for pickup from a potential passenger via a first communication from a mobile device;
register authorization information based on the first communication;
determine an availability of one or more of the plurality of seats disposed within the vehicle;
control the first display panel to display a negative availability indication based on the determined availability of the one or more of the plurality of seats;
control the second display panel to display a positive availability indication based on the determined availability of the one or more of the plurality of seats;
receive a request for vehicle access via a second communication input into the second display panel, wherein the second communication includes authorization information; and
control the second door of the vehicle to allow the potential passenger access to the vehicle via the second door in response to the authorization information registered based on the first communication corresponding to the authorization information from the second communication.

15. The system of claim 14, further comprising:
an occupant detection device configured to detect which of the plurality of seats an occupant of the vehicle is seated within, wherein the controller is configured to determine the availability of one or more of the plurality of seats disposed within the vehicle based on the detection of the seated occupant by the occupant detection device.

16. The system of claim 14, wherein the controller is configured to determine the availability of one or more of the plurality of seats disposed within the vehicle based on a communication received by the controller from a second potential passenger.

17. The system of claim 1, wherein the first availability indication is a negative availability indication, and the second availability indication is a positive availability indication.

18. The system of claim 17, wherein the negative availability indication is displayed on the first display as a first color, and the positive availability indication is displayed on the second display in a second color that is different than the first color.

19. The system of claim 1, wherein the authorization information of the second communication comprises a unique identification code input by the user into the at least one of the first and second display panels.

20. The system of claim 14, wherein access to the vehicle is provided by the second door based on the determined availability of the one or more of the plurality of seats within the vehicle.

* * * * *